(12) United States Patent
Toberman (10) Patent No.: US 10,400,188 B2
(45) Date of Patent: Sep. 3, 2019

(54) PROCESS AND SYSTEM FOR PRODUCING ENGINEERED FUEL

(71) Applicant: WM INTELLECTUAL PROPERTY HOLDINGS, L.L.C., Houston, TX (US)

(72) Inventor: Richard A. Toberman, Galveston, TX (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 15/192,533

(22) Filed: Jun. 24, 2016

(65) Prior Publication Data

US 2016/0376516 A1    Dec. 29, 2016

Related U.S. Application Data

(60) Provisional application No. 62/184,163, filed on Jun. 24, 2015.

(51) Int. Cl.
*C10L 5/46* (2006.01)
*C10L 5/40* (2006.01)
(Continued)

(52) U.S. Cl.
CPC .................................. *C10L 5/46* (2013.01);
*B03B 9/06* (2013.01); *C10L 5/406* (2013.01);
*C10L 2290/08* (2013.01); *C10L 2290/28*
(2013.01); *C10L 2290/30* (2013.01); *C10L*
*2290/38* (2013.01); *C10L 2290/40* (2013.01);
*C10L 2290/54* (2013.01); *C10L 2290/546*
(2013.01); *Y02E 50/10* (2013.01); *Y02E 50/30*
(2013.01)

(58) Field of Classification Search
CPC combination set(s) only.
See application file for complete search history.

(56) References Cited

U.S. PATENT DOCUMENTS 4,063,903 A * 12/1977 Beningson ............ B02C 17/007
110/220
4,152,119 A    5/1979 Schulz
(Continued)

FOREIGN PATENT DOCUMENTS

DE    202008001933    5/2008
DE    202008008551    10/2008
(Continued)

OTHER PUBLICATIONS

Patent Cooperation Treaty; PCT International Search Report; Issued in connection to PCT/US2016/039357; dated Sep. 14, 2016; 4 pages; European Patent Office; Europe.
(Continued)

*Primary Examiner* — Ellen M McAvoy
*Assistant Examiner* — Chantel L Graham
(74) *Attorney, Agent, or Firm* — Greenberg Traurig LLP (57) ABSTRACT

A process and system for producing an engineered fuel product that meets customer specifications for composition and combustion characteristics is provided. The engineered fuel product is preferably a high-BTU, alternative fuel that burns cleaner than coal or petroleum coke (petcoke) and has significantly reduced NOx, $SO_2$ and GHG emissions.

25 Claims, 2 Drawing Sheets

(51) Int. Cl.
*C10L 5/08* (2006.01)
*C10L 5/44* (2006.01)
*B03B 9/06* (2006.01)

(56) References Cited

U.S. PATENT DOCUMENTS

| | | | |
|---|---|---|---|
| 4,200,486 A | 4/1980 | Vagac et al. | |
| 4,245,999 A * | 1/1981 | Reiniger | B02C 13/14 |
| | | | 209/17 |
| 4,529,407 A | 7/1985 | Johnston et al. | |
| 4,859,211 A | 8/1989 | Moore | |
| 4,888,852 A | 12/1989 | Varin | |
| 4,935,038 A | 6/1990 | Wolf | |
| 5,104,047 A | 4/1992 | Simmons | |
| 5,342,418 A | 8/1994 | Jesse | |
| 5,413,487 A | 5/1995 | Lundell | |
| 5,429,645 A | 7/1995 | Benson et al. | |
| 5,441,990 A | 8/1995 | Robin et al. | |
| 5,464,760 A | 11/1995 | Tsai et al. | |
| 5,568,996 A | 10/1996 | Buehler | |
| 5,643,342 A | 7/1997 | Andrews | |
| 5,888,256 A | 3/1999 | Morrison | |
| 5,980,595 A | 11/1999 | Andrews | |
| 6,000,639 A | 12/1999 | Ganguli | |
| 6,113,662 A | 9/2000 | Sprules | |
| 6,149,694 A * | 11/2000 | Redden, Jr. | C05F 3/00 |
| | | | 44/552 |
| 6,270,655 B1 | 8/2001 | Ganguli | |
| 6,271,270 B1 | 8/2001 | Muzzy et al. | |
| 6,635,093 B1 | 10/2003 | Schoen et al. | |
| 6,692,544 B1 | 2/2004 | Grillenzoni | |
| 7,252,691 B2 | 8/2007 | Philipson | |
| 7,302,407 B2 | 11/2007 | Bohlig et al. | |
| 7,341,156 B2 | 3/2008 | Bohlig et al. | |
| 7,355,521 B2 | 4/2008 | McCauley et al. | |
| 7,419,514 B2 | 9/2008 | Whitney | |
| 7,674,303 B2 | 3/2010 | Flanery et al. | |
| 7,869,900 B2 | 1/2011 | McCauley et al. | |
| 8,192,512 B2 | 6/2012 | Bohlig et al. | |
| 8,192,513 B2 | 6/2012 | Bohlig et al. | |
| 8,234,224 B2 | 7/2012 | Bohlig et al. | |
| 8,318,064 B2 | 11/2012 | Parish | |
| 8,349,034 B2 | 1/2013 | Calabrese et al. | |
| 8,382,862 B2 | 2/2013 | Bohlig et al. | |
| 8,382,863 B2 | 2/2013 | Bohlig et al. | |
| 8,444,721 B2 | 5/2013 | Bai | |
| 8,459,466 B2 | 6/2013 | Duffy et al. | |
| 8,459,581 B2 | 6/2013 | Bai | |
| 8,523,962 B2 | 9/2013 | Bohlig et al. | |
| 8,579,997 B2 | 11/2013 | Bai | |
| 8,585,787 B2 | 11/2013 | Bai et al. | |
| 8,590,708 B2 | 11/2013 | Bohlig et al. | |
| 8,617,264 B2 | 12/2013 | Bohlig et al. | |
| 8,631,668 B2 | 1/2014 | Duffy et al. | |
| 8,636,235 B2 | 1/2014 | Bai | |
| 8,746,599 B2 | 6/2014 | Bai | |
| 8,786,442 B2 | 7/2014 | Langlois et al. | |
| 8,828,105 B2 | 9/2014 | Calabrese et al. | |
| 8,852,302 B2 | 10/2014 | Bai | |
| 8,906,119 B2 | 12/2014 | Bohlig et al. | |
| 8,915,199 B2 | 12/2014 | Bohlig et al. | |
| 8,999,014 B2 | 4/2015 | Bai | |
| 9,062,268 B2 | 6/2015 | Bai | |
| 9,126,204 B1 | 9/2015 | Toberman et al. | |
| 9,162,231 B2 | 10/2015 | Bai | |
| 9,181,508 B2 | 11/2015 | Bohlig et al. | |
| 9,217,188 B2 | 12/2015 | Bohlig et al. | |
| 9,487,722 B2 | 11/2016 | Bai et al. | |
| 9,523,051 B2 | 12/2016 | Bai et al. | |
| 9,650,584 B2 | 5/2017 | Bai | |
| 9,688,931 B2 | 6/2017 | Bai et al. | |
| 9,752,086 B2 | 9/2017 | Bohlig et al. | |
| 9,765,269 B2 | 9/2017 | Bahlig et al. | |
| 9,879,195 B2 | 1/2018 | Bai | |
| 9,908,807 B2 | 3/2018 | Duffy et al. | |
| 10,174,268 B2 | 1/2019 | Bai et al. | |
| 2002/0184816 A1 | 12/2002 | Philipson | |
| 2003/0153797 A1 | 8/2003 | Percell | |
| 2006/0032113 A1 | 2/2006 | Whitney | |
| 2006/0112616 A1 | 6/2006 | Noll et al. | |
| 2006/0123697 A1 | 6/2006 | Jansen | |
| 2006/0153797 A1 | 7/2006 | Bortolotto et al. | |
| 2006/0254957 A1 | 11/2006 | Bohlig et al. | |
| 2007/0075870 A1 | 4/2007 | McCauley et al. | |
| 2007/0078524 A1 | 4/2007 | McCauley et al. | |
| 2007/0182776 A1 | 8/2007 | Parish et al. | |
| 2008/0237093 A1 | 10/2008 | Bohlig et al. | |
| 2008/0290006 A1 | 11/2008 | Duffy et al. | |
| 2009/0235577 A1 | 9/2009 | Flanery et al. | |
| 2009/0272028 A1 | 11/2009 | Drozd et al. | |
| 2010/0018113 A1 | 1/2010 | Bohlig et al. | |
| 2010/0031560 A1 | 2/2010 | Calabrese et al. | |
| 2010/0126061 A1 | 5/2010 | Calabrese et al. | |
| 2010/0144905 A1 | 6/2010 | Reaveley et al. | |
| 2011/0209397 A1 | 9/2011 | Bohlig et al. | |
| 2011/0214341 A1 | 9/2011 | Nafid et al. | |
| 2012/0037733 A1 | 2/2012 | Gitschel | |
| 2012/0048974 A1 | 3/2012 | Gitschel | |
| 2012/0048975 A1 | 3/2012 | Gitschel | |
| 2012/0190102 A1 | 7/2012 | Gitschel et al. | |
| 2012/0266793 A1 | 10/2012 | Bohlig et al. | |
| 2012/0304536 A1 | 12/2012 | Bai | |
| 2012/0305686 A1 | 12/2012 | Bai | |
| 2013/0055630 A1 | 3/2013 | Bohlig et al. | |
| 2013/0097921 A1 | 4/2013 | Calabrese et al. | |
| 2013/0166411 A1 | 6/2013 | Bohlig et al. | |
| 2013/0192128 A1 | 8/2013 | Bai et al. | |
| 2013/0240647 A1 | 9/2013 | Bai | |
| 2013/0298454 A1 | 11/2013 | Bai | |
| 2013/0298455 A1 | 11/2013 | Bai | |
| 2015/0089863 A1 | 4/2015 | Bai | |
| 2015/0096222 A1 | 4/2015 | Calabrese et al. | |
| 2015/0135583 A1 | 5/2015 | Bai | |
| 2015/0197698 A1 | 7/2015 | Bohlig et al. | |
| 2015/0211736 A1 | 7/2015 | Bohlig et al. | |
| 2016/0002546 A1 | 1/2016 | Bai | |
| 2016/0010012 A1 | 1/2016 | Bai | |
| 2016/0090540 A1 | 3/2016 | Bohlig et al. | |
| 2016/0108328 A1 | 4/2016 | Bohlig et al. | |
| 2016/0230108 A1 | 8/2016 | Bai | |
| 2016/0369195 A1 | 12/2016 | Bai | |
| 2017/0073599 A1 | 3/2017 | Bai et al. | |
| 2017/0114292 A1 | 4/2017 | Bai et al. | |
| 2017/0137729 A1 | 5/2017 | Bai et al. | |
| 2017/0283726 A1 | 10/2017 | Bai | |
| 2018/0037830 A1 | 2/2018 | Bohlig et al. | |
| 2018/0086995 A1 | 3/2018 | Bohlig et al. | |
| 2018/0327682 A1 | 11/2018 | Bai | |

FOREIGN PATENT DOCUMENTS

| | | |
|---|---|---|
| DE | 202009004734 | 7/2009 |
| DE | 202010005318 | 7/2010 |
| DE | 202012101824 | 6/2012 |
| DE | 202011109982 | 7/2012 |
| DE | 202012102002 | 7/2012 |
| DE | 202013105882 | 3/2014 |
| DE | 102012106307 A1 | 5/2014 |
| WO | 2009/158539 | 12/2009 |
| WO | 2009/158540 | 12/2009 |
| WO | 2012/071060 | 5/2012 |
| WO | 2012/071112 | 5/2012 |
| WO | 2016/210326 A1 | 12/2016 |

OTHER PUBLICATIONS

Patent Cooperation Treaty; PCT Written Opinion of the International Searching Authority; Issued in connection to PCT/US2016/039357; dated Sep. 14, 2016; 7 pages; European Patent Office; Europe.

European Patent Office; English Translation DE102012106307; downloaded Sep. 21, 2016; 17 pages; Europe.

(56) References Cited

OTHER PUBLICATIONS

Kela Energy, LLC; KeLa Engineered Fuels; Mar. 2008; KeLa Energy, LLC; U.S.; Powerpoint; 21 pages.
Kela Energy, LLC; CIBO, Technical Focus Group Environmental & Energy Committee Meetings; Sep. 2009; KeLa Energy, LLC; U.S.; Powerpoint; 16 pages.
Fyffe, John R. et al.; Residue-Derived Solid Recovered Fuel for Use in Cement Kilns; Jul. 1, 2012; 114 pages.
United States Environmental Protection Agency (USEPA)—Office of Resource Conservation and Recovery; Request for comfort letter (and enclosures) from Waste Management to USEPA dated Mar. 16, 2012; 18 pages.
United States Environmental Protection Agency (USEPA)—Office of Resource Conservation and Recovery; Letter (and enclosures) from Waste Management to USEPA dated Dec. 6, 2012 regarding third party FOIA requests; 257 pages.
United States Environmental Protection Agency (USEPA)—Office of Resource Conservation and Recovery; Comfort letter (and various footnoted materials) from USEPA to Waste Management dated Aug. 22, 2013; 97 pages.
Sandy Bauers, "Trash plan—and pellets—approved; more talk about all"; Philly.com, Posted Thursday, Jun. 7, 2012; 5 pages.
Accordant Energy, LLC; Declaration, filed in connection to Patent Interference No. 106,104; Jan. 15, 2019; 8 pages; US.
File History for Patent Interference No. 106,104; 2019; 195 pages; US. 2019.

\* cited by examiner

PROCESS AND SYSTEM FOR PRODUCING ENGINEERED FUEL

CROSS REFERENCE TO RELATED APPLICATIONS

This application claims the benefit and priority benefit of U.S. Provisional Patent Application Ser. No. 62/184,163, filed Jun. 24, 2015, titled "PROCESS AND SYSTEM FOR PRODUCING ENGINEERED FUEL," the disclosure of which is incorporated by reference herein in its entirety.

BACKGROUND

Field of Invention

This invention relates generally to the production of engineered fuel and to an improved process and system for producing an engineered fuel product that meets customer specifications for composition and/or combustion characteristics.

Description of the Related Art

The following descriptions and examples are not admitted to be prior art by virtue of their inclusion within this section.

It is known in the art that landfill-bound waste can instead be processed to form a fuel product that can be used as an alternative energy source to replace or supplement traditional energy sources such as coal, petroleum coke and woody biomass. Improvements to this technology are desired.

SUMMARY

The following presents a simplified summary of the disclosed subject matter in order to provide a basic understanding of some aspects of the subject matter disclosed herein. This summary is not an exhaustive overview of the technology disclosed herein.

In certain illustrative embodiments, a process for treating a solid waste material is provided. The process can include the following non-exclusive steps. In certain aspects, a first set of waste components can be removed from the solid waste material. The first set of waste components can include, for example, ferrous and non-ferrous metals. The solid waste material can be shredded in a primary shredder. The material can be shredded, for example, to a particle size of 10-inch or less. A second set of waste components can be removed from the solid waste material. The second set of waste components can include, for example, one or more of organics, glass, aggregates, wood, electrical components, batteries, textiles, rubber, and yard waste. A clean stream can be proportionally added to the solid waste material. The clean stream can include, for example, fibers and clean plastics. A third set of waste components can be removed from the solid waste material. The third set of waste components can include, for example, ferrous and non-ferrous metals of less than 10 square inches (two dimensional). All or substantially all of the remaining solid waste material can be shredded to a particle size of 2-inch or less. The solid waste material can then be densified to form an engineered fuel product such as, for example, fuel pellets. The ferrous and non-ferrous metals of the first set of waste components can have a size and density that is beyond the handling capacity of the primary shredder, and could cause damage to the primary shredder. For example, the ferrous and non-ferrous metals of the first set of waste components can have a size of 12-inch by 8-inch (length and width) by ½-inch (thickness) or greater. The solid waste material can be one or more of municipal solid waste and residual solid waste. The organics can include one or more of food waste and yard waste, wood, glass, textiles, aggregates, small batteries, small electronics and rubber.

In certain aspects, the step of removing the first set of waste components from the solid waste material can include one or more additional steps. For example, the solid waste material can be passed under a metal detector via a conveyer moving in a forward direction. The movement of the conveyer can be reversed to a backwards direction if the metal detector detects the first set of waste components in the solid waste material, and the first set of waste components can be removed from the conveyer. In certain aspects, the step of removing the second set of waste components from the solid waste material can include passing the solid waste material through an air classifier. In certain aspects, the step of removing the third set of waste components from the solid waste material can include additional steps. For example, the solid waste material can be passed under a magnet to remove the ferrous metals. The solid waste material can also be passed through an eddy current separator to remove the non-ferrous metals. The ferrous metals and/or non-ferrous metals can have a size of 10 square inches (10-inch) or less. The metals can be essentially two dimensional at this point in the process. The solid waste can also be passed through a screener to reject materials having a particle size of 2-inch or less after shredding the solid waste material to a particle size of 10-inch or less (again, essentially two-dimensional).

In certain illustrative embodiments, the solid waste material can be densified to produce an engineered fuel product. The engineered fuel product can be a pelletized product having a weight density of nominal 30-35 pounds/cubic ft. The engineered fuel product can also be a non-pelletized product having a weight density of nominal 22 pounds/cubic ft. In some aspects, ninety nine percent (99%) or greater by volume of the engineered fuel product can comprise fibers and clean plastics. The solid waste material can have a moisture content of ±fifty five percent (55%) prior to removing the first set of waste components from the solid waste material. The engineered fuel product can have a moisture content of fifteen percent (15%) or less. The engineered fuel product can have a chloride content of three tenths of one percent (0.3%) or less. The engineered fuel product can have a heating value of nominal 11,000 BTU/pound.

In certain illustrative embodiments, a process for controlling the moisture content of an engineered fuel product made from a solid waste material is provided. The solid waste material can include heavier weight components, medium weight components and lighter weight components. The solid waste material can be introduced into a separator. The heavier weight components can be separated from the medium weight components and the lighter weight components in the separator. A receiver can be positioned at either a first receiving location or a second receiving location with respect to the separator. The receiver can be capable of receiving the medium weight components and the light weight components. The first receiving location can be capable of receiving more of the medium weight components than the second receiving location. An amount of the medium weight components and an amount of the lighter weight components can be captured in the receiver. The medium weight components and lighter weight components from the receiver can be densified to produce the engineered fuel product. In certain aspects, the combined medium weight components and lighter weight components can have a nominal density of 8 pounds/cubic foot or less. The heavier weight components can include one or more organics from the group of wood, textiles, aggregates and rubber. The medium weight components can include one or more from the group of fibers and rigid plastics. The lighter weight components can include one or more from the group of foam plastics and film plastics.

In certain illustrative embodiments, the moisture content of the engineered fuel product can be adjusted by moving the location of the receiver. For example, the moisture content of the engineered fuel product can be decreased by moving the receiver from the first receiving location to the second receiving location such that the receiver receives less of the medium weight components. Also, the moisture content of the engineered fuel product can be increased by moving the receiver from the second receiving location to the first receiving location such that the receiver receives more of the medium weight components. The receiver can be a single receiver that receives both the lighter weight components and the medium weight components. The receiver can be a moveable conveyer belt. The separator can be an air classifier. The amount of heavy weight components captured in the receiver can be less than one percent of the total amount of medium weight components and light weight components captured in the receiver. The solid waste material can include one or more of municipal solid waste and residual solid waste. A clean stream can be proportionally added to the medium weight components and lighter weight components prior to densifying the medium weight components and lighter weight components. The clean stream can include one or more from the group of fibers and clean plastics. The solid waste material can have a moisture content of ±55% prior to entering the air classifier. The engineered fuel product can have a moisture content of 15% or less.

BRIEF DESCRIPTION OF THE DRAWINGS

A better understanding of the presently disclosed subject matter can be obtained when the following detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates generally to the production of engineered fuel and to a process and system for producing an engineered fuel product. The subject matter is described more fully hereinafter with reference to the accompanying drawings in which embodiments of the process and system are shown. The process and system may, however, be embodied in many different forms and should not be construed as limited to the embodiments set forth herein; rather, these embodiments are provided so that this disclosure will be thorough and complete, and will fully convey the scope of the process and system to those skilled in the art.

In certain illustrative embodiments, a process is provided for extracting commodities of value such as fibers and clean plastics from municipal solid waste that would otherwise be landfilled. As used herein, the term "municipal solid waste" or "MSW" means waste that includes, but is not limited to, one or more of the following materials: heavy weight materials (i.e., aggregates, glass, textiles, rubber, etc. . . . ), medium weight materials (i.e., fibers and rigid plastics), light weight materials (i.e., foam plastics and film plastics), PVC plastics, ferrous and non-ferrous metals, inert residues, organic materials (i.e., food waste) and very heavy and/or bulky materials. As used herein, the term "fibers" includes paper and/or cardboard and like materials, the term "clean plastics" includes rigid plastics, foam plastics and film plastics and like materials, and the term "undesirable plastics" means plastics that are known to contain high levels of chlorine (i.e., PVC plastics).

In certain illustrative embodiments, municipal solid waste containing post-recycle materials can undergo a multi-step, mechanically engineered process to prepare an engineered fuel product. The engineered fuel product is preferably a high-BTU, alternative fuel that burns cleaner than coal or petroleum coke (Pet Coke) and has significantly reduced NOx, $SO_2$ and GHG emissions. The engineered fuel product can consist of 99% or greater post-recycle fibers and clean plastics, in certain illustrative embodiments. As used throughout this application, the term "%" means volume percent unless otherwise specifically indicated.

The presently disclosed process and system for producing an engineered fuel product are preferably precise and rigorous, and can result in a homogeneous and highly consistent solid fuel product designed to meet the customer's specifications for composition and/or combustion characteristics. In certain illustrative embodiments, a heterogeneous, contaminated unprocessed waste material with low commercial fuel and recycling value can be converted into a high-value, high-BTU fuel product. Ongoing batch sampling and analysis and continuous spectroscopic analysis of feedstock can ensure fuel integrity and composition. In certain illustrative embodiments, ferrous and non-ferrous metals and undesirable plastics can be extracted from the municipal solid waste as rejected materials. After these unwanted materials have been extracted and isolated from the commodities of value (primarily fibers and clean plastics), the commodities of value can be proportionately recombined to produce an engineered solid fuel product with a consistent and predictable heating value. The engineered fuel product can be managed and sold as a valuable solid fuel commodity.

The presently disclosed process and system are substantially different from previous approaches that simply shred and pelletize refuse-derived fuel (RDF). Instead, the presently disclosed process and system can transform materials that would otherwise be disposed into commodities that can be beneficially reused and that meet customer specifications for composition and/or combustion characteristics.

In certain illustrative embodiments, a single plant utilizing the presently disclosed process and system can potentially handle approximately 300,000 tons per year or 1,000 tons per day of in-bound feedstock material. The primary feedstock is preferably non-hazardous secondary material ("NHSM") derived from municipal solid waste. The municipal solid waste may have undergone some preliminary source separation by households or businesses to extract recyclables that were collected and processed through local recycling programs where implemented. The primary feedstock may also be augmented with commercial and industrial secondary material streams such as hard-to-recycle plastics.

This feedstock, otherwise bound for the landfill, can be diverted to the engineered fuel processing plant where mechanical and spectroscopic equipment can isolate and reject unwanted materials from fibers and clean plastics extracted for fuel production. In certain illustrative embodiments, the presently disclosed process and system can capture about 40-55% of the total, raw in-bound material stream for production of the engineered fuel product. The remaining paper, plastics, metals, glass, other inert residues and food wastes can be extracted for recycling, eventual treatment or disposal. For example, old corrugated containers and ferrous and non-ferrous metals, which can comprise about 5-7% of the in-bound material stream, can be extracted for recycling. Also, organic materials (primarily food waste), which can comprise about 20-30% of the in-bound material stream, can be extracted for potential treatment via composting or anaerobic digestion. Finally, rejected heavy materials, inert residues and PVC plastics, which can comprise about 20-30% of the in-bound material stream, can be sent to landfill.

In certain illustrative embodiments, the process and system can comprise one or more of the following stages, aspects of which are described in U.S. Pat. No. 9,126,204 issued Sep. 8, 2015, and assigned to WM Intellectual Property Holdings LLC, the disclosure of which is incorporated by reference herein in its entirety:

Stage 1: Removal of Heavy and/or Bulky Items

In a first stage, in-bound solid waste collection vehicles entering the process facility can be diverted from the landfill and directed to discharge their municipal solid waste loads for presorting. In certain illustrative embodiments, the loads can be placed onto an inbound tipping floor. The municipal solid waste can be presorted on tipping floor to remove very heavy and/or bulky materials deemed unsuitable for the engineered fuel product (i.e., tires, mattresses, post-consumer carpet, etc. . . . ). On tipping floor, readily identifiable, high-quality, and safely accessible recyclable fibers and clean plastics can also be removed. Removal can be performed using excavators and wheel loaders, as would be understood by one of ordinary skill in the art. The remaining raw materials comprise a treatable municipal solid waste stream that can then proceed through the subsequent steps and equipment of the presently disclosed process and system.

In certain illustrative embodiments, metals are contained within the raw in-bound solid waste, received initially on the tipping floor. Large metallic components of high density and physical size±25-inches (i.e. tire rims, brake drums, metal doors, etc.), that could cause damage to the primary shredder are removed on the process floor using a magnetic four over three grapple claw attached to the excavator boom (pictures attached showing the grapple claw and Volvo excavator with grapple attachment). A second process step, to remove further metallic components occurs, when solid waste material is initially conveyed forward into the process. Solid waste material is conveyed forward through a metal detector preset to remove metallic components greater than 12-inches by 8-inches by ½-inch thickness. Metallic components greater than ½-inch thick have a high probability of damaging to the internal cutters of the primary shredder.

Stage 2: Slow-Speed, High Torque, Primary Pre-Shredding

In a second stage, the municipal solid waste can be pre-shredded. In certain illustrative embodiments, in-feed belt can deliver the municipal solid waste to a primary shredder. Pre-shredding can break up the materials in the municipal solid waste to produce a homogeneous material suitable for further mechanical processing. Primary shredder can reduce the materials in the municipal solid waste to 12-inch minus dimensional size, in certain illustrative embodiments. In general, shredder can reduce the municipal solid waste to a more manageable size and homogenize and volumetrically expand the raw materials therein.

Stage 3: Removal of Large Metal Objects

In a third stage, large metal objects can be removed from the municipal solid waste. In certain illustrative embodiments, an in-feed belt can mechanically convey the municipal solid waste away from tipping floor. While travelling on in-feed belt, the municipal solid waste can pass through one or more metal detectors, which can detect and eject large metallic items such as propane tanks and other large metallic or dense items which may be contained within non-transparent containers and bags in the municipal solid waste.

Stage 4: Ferrous Metal Extraction

In a fourth stage, ferrous metals can be extracted. In certain illustrative embodiments, the municipal solid waste can be conveyed away from primary shredder via fourth stage belt. An over-belt magnet can be positioned over fourth stage belt to extract ferrous metals. Throughout the presently disclosed process, over-belt magnets can be positioned at some or all extraction points to extract any remaining ferrous metals in the municipal solid waste and maximize ferrous metal recovery. All ferrous metals extracted from the municipal solid waste are preferably recycled. In certain illustrative embodiments, metal extraction and recovery for recycle of ferrous & non-ferrous metals can represent around 5% of the total raw material mass balance, which represents all or substantially all of the ferrous & non-ferrous metals from the municipal solid waste.

Stage 5: Screening of Organic Materials

In a fifth stage, organic materials can be screened from the municipal solid waste. In certain illustrative embodiments, the municipal solid waste from fourth stage belt can undergo screening via screener. All or substantially all of the organic materials can be extracted via screener to promote a consistent, high heating value in the engineered fuel product. In certain illustrative embodiments, organic materials can represent about 20-30% of the total in-bound municipal solid waste. In certain illustrative embodiments, the organic materials are <2 inches in size, and 90% or more of these organic materials are food waste. Possible treatment options for these organic materials can include composting and/or anaerobic digestion.

Stage 6: Multi-Step Air Classification

In a sixth stage, the raw materials in the municipal solid waste can be separated by weight density to produce a plurality of distinct streams. In certain illustrative embodiments, a multi-step air classifier can be utilized to separate the municipal solid waste into a heavy weight materials stream, a medium weight materials stream and a light weight materials stream. In certain illustrative embodiments, the medium weight materials can represent around 50-55% of the raw-in bound material mass balance.

In a first section, multi-step air classifier can separate the heavy weight materials from the medium weight materials and light weight materials to form heavy weight materials stream. The extracted heavy weight materials are typically deemed unsuitable for the engineered fuel product, and after passing under an over-belt magnet to extract remaining ferrous metals, the heavy weight materials stream (primarily inert waste) can be disposed in the landfill. In certain illustrative embodiments, first section can remove all or substantially all of the heavy weight materials from the municipal solid waste, with substantially all of the heavy weight materials comprising at least 25-30% of the municipal solid waste.

In a second section, the multi-step air classifier can separate the medium weight materials from the light weight materials to form a plurality of distinct streams. In an illustrative embodiment, the plurality of distinct streams can comprise medium weight materials stream and light weight materials stream, although additional streams of, for example, medium-light weight materials, could also be formed in other embodiments. In certain illustrative embodiments, the separation can be performed by weight density based on air flows, residence times and/or material recirculation. In certain illustrative embodiments, the equipment operators can select materials for recirculation and can move materials between sections of air classifier to control the materials that ultimately exit air classifier. Also, controlled particulate matter air scrubbers (not shown) can be used in classifier to eliminate dust within the negative-air controlled confines of the processing plant, in certain illustrative embodiments.

Stage 7: Eddy Current (Non-Ferrous Metal Extraction)

In a seventh stage, non-ferrous metals can be removed for recycling. The medium weight materials stream and light weight materials stream can exit the multi-step air classifier and be discharged onto separate conveyor lines. Conveyor lines can then be exposed to one or more electromagnets (e.g., eddy current) whereby the non-ferrous metals can be removed from the medium weight materials stream and light weight materials stream.

Stage 8: NIR/HIS (Near Infrared Spectroscopic/Hyper Spectral Imaging) Sorting

In an eighth stage, the medium weight materials and the light weight materials can undergo two distinct processing steps, in certain illustrative embodiments.

First, the materials can undergo chlorine removal. In certain illustrative embodiments, conveyor lines can be routed through an NIR/HIS (near infrared spectroscopic/hyper spectral imaging) sorter, such as the one manufactured by RTT Steinert GmbH, Pellenc ST, or Tomra Sorting Solutions a.k.a, TiTech NIR/HIS sorter can be programmed to identify and eject PVC plastic materials with high chlorine content. Chlorine removal is a critical step in the process, in certain illustrative embodiments, as it alters the chemical composition of the engineered fuel product to improve fuel characteristics. NIR/HIS sorter can also be programmed to identify and eject metallic materials not extracted by overbelt magnets or eddy currents. NIR/HIS sorter can preferably provide granular data on plastic content by resin type and percentage, as well as by biogenic fiber components. In certain illustrative embodiments, NIR/HIS sorter can be designed to record up to 27 million detections per second at a 320 pixel resolution. In certain illustrative embodiments, NIR/HIS sorter has the ability to create a data log of all engineered fuel material components in the medium weight materials and the light weight materials by material percentage, i.e., biogenic fiber and plastic.

Second, some or all remaining metals can be removed from the materials. NIR/HIS sorter can identify metals that were not extracted by the previous over-belt magnets and eddy currents in the process. NIR/HIS sorter can detect the light reflected from the objects onto highly sensitive NIR sensors and, in certain illustrative embodiments, is capable of detecting objects as small as one-half inch in size. NIR/HIS sorter can identify and pinpoint the location of a particular object in the medium weight materials on one conveyor line or the light weight materials on the other conveyor line. A precise puff of air from nozzles associated with the NIR/HIS sorter can eject any undesirable materials before the municipal solid wastes on conveyor lines are discharged from the NIR/HIS sorter, in certain illustrative embodiments.

In certain illustrative embodiments, NIR equipment can also be utilized in various other locations in the process and system. For example, a NIR scanner can be disposed at one or more of the following locations: before third stage (pre-shredding), before fifth stage (organics screening), before and after sixth stage (multi-step air classification), before stage (shredding) and before stage (staging/drying). NIR scanners can detect moisture in the municipal solid waste. The data recorded by NIR scanners can be used to either increase or reduce the process flow rate. For example, when the process flow rate is reduced, more moisture laden material can be extracted from the municipal solid waste, preferably at an early stage of the process and system to promote more efficient separation of heavy weight materials, medium weight materials and light weight materials. NIR scanners can also detect moisture in the municipal solid waste at later stages in the process and system to control the moisture content of the engineered fuel product.

Stage 9: Fine Tuning of Engineered Fuel Product

In a ninth stage, the medium weight materials and light weight materials that were previously separated during sixth stage can be proportionately recombined. Also, in a related stage 9a, pre-sorted materials can be proportionally added to the recombined stream of medium weight and light weight materials to produce a "fine-tuned" recombined stream. The "fine-tuned" recombined stream can be used to produce an engineered fuel product that meets customer specifications for various desired features.

In certain illustrative embodiments, the medium weight materials and light weight materials on conveyor lines are recombined to form recombined stream. For example, conveyor lines can be combined in recombiner. The mix of medium weight materials and light weight materials can produce a fuel that is approximately 50% fiber and 50% plastic with a heat content of approximately 9000 Btu/pound, in certain illustrative embodiments.

In certain illustrative embodiments, selected clean materials known as "pre-sorts" can be added to recombined stream. The pre-sorts can be proportionally incorporated into recombined stream to produce a fine-tuned recombined stream. The pre-sorts can comprise a clean stream of fibers and/or clean plastics, in certain illustrative embodiments. For example, the clean plastics pre-sorts can comprise polyethylene, polypropylene and/or polystyrene plastics all having a known BTU content, such as post-industrial waste like polypropylene automobile carpet trims and/or polyethylene food wrappers.

As used herein, the term "fine-tuned recombined stream" means a stream comprising recombined stream and clean stream. The materials in clean stream can have a known heat content that will produce desired properties in the engineered fuel product.

In certain illustrative embodiments, adding pre-sorts mainly comprising fibers will typically reduce the heating value and increase the biogenic content of the engineered fuel product. As used herein, the term "biogenic content" means content of plant-based carbon molecules. Higher biogenic carbon fuels are of value to utility-based end-users seeking a lower heat content/higher biogenic content fuel that potentially will qualify in their fuel portfolio for renewable energy credits. In certain illustrative embodiments, clean stream and recombined stream will each have a biogenic content and fine-tuned recombined stream will have a higher biogenic content than recombined stream when clean stream comprises more fibers than clean plastics.

In other illustrative embodiments, adding pre-sorts mainly comprising clean plastics will typically increase the heat content of the engineered fuel product. Thus, fine tuning can chemically improve the as-fired energy content of the engineered fuel product for end-users seeking a higher heating value fuel. For example, a mix of 30% fibers/70% plastics can produce a 11,500 Btu/pound fuel, a mix of 50% fibers/50% plastics can produce a 9000 Btu/pound fuel, and a mix of 70% fibers/30% plastics can produce a 7500 Btu/pound fuel, in certain illustrative embodiments. In certain illustrative embodiments, clean stream and recombined stream will each have a heat content and fine-tuned recombined stream will have a higher heat content than recombined stream when clean stream comprises more clean plastics than fibers. Also, in certain illustrative embodiments, binding and scrubbing materials can be added to fine-tuned recombined stream to adjust the biogenic content and enhance the emissions characteristics of the engineered fuel product.

In certain illustrative embodiments, the pre-sorts can be added to recombined stream via a by-pass conveyer. The pre-sorts from by-pass conveyer can be incorporated at a metered rate into recombined stream. Preferably, the pre-sorts will be stored separately from any inbound municipal solid waste coming in the plant.

In certain illustrative embodiments, pre-sorts can be added to the municipal solid waste at other locations besides, or in addition to, the recombined stream. For example, pre-sorts in the form of clean plastics or fibers can be added to the municipal solid waste at one or more of third stage 3 (pre-shredding) and/or in the recombined stream at ninth stage (fine tuning). Further, pre-sorts in the form of clean plastics or fibers can be added to the municipal solid waste at one or more of third stage (pre-shredding), prior to sixth stage (multi-step air classification) and/or in the recombined stream at ninth stage (fine tuning). In certain illustrative embodiments, adding pre-sorts to the municipal solid waste relatively early in the process (i.e., prior to sixth stage) allows a user to reduce the moisture percentage in the municipal solid waste and promote more efficient separation of heavy weight materials, medium weight materials and light weight materials.

Stage 10: High Speed Shredding

In a tenth stage, fine-tuned recombined stream can undergo additional shredding. In certain illustrative embodiments, fine-tuned recombined stream can be passed through a high speed shredder that can shred stream to <2-inch minus particle size. The purpose of this additional shredding is to produce a particle size that can easily pass through the dies of densifier (as described in Stage 13) without causing plugging.

Stage 11: Staging/Drying

In an eleventh stage, staging and drying can occur. Fine-tuned recombined stream can be staged and dried in a dryer as needed. For example, in certain illustrative embodiments, optimal performance in densifier of Stage 13 requires that the inbound feed to densifier should have approximately 15% moisture content. During densification, densifier will typically release approximately 5% moisture in the form of steam, thus yielding a process engineered fuel product with a moisture content of approximately 10%. In certain illustrative embodiments, this 10% moisture content can be achieved by utilizing dryer and/or by adding dry pre-sorts to the municipal solid waste at various stages of the process.

Stage 12: Final Tramp Material Removal

In a twelfth stage, the fine-tuned recombined stream can undergo at least one final extraction step to ensure elimination of tramp metals. As used herein, the term "tramp metals" means ferrous or non-ferrous metals and inert fines of 1-inch or less that that have not already been removed and that could damage the fuel production equipment. In certain embodiments, fine-tuned recombined stream can pass through a tramp separator to extract tramp metals. In other embodiments, tramp separator is not utilized, and the fine-tuned recombined stream is conveyed directly from dryer to densifier of Stage 13.

Stage 13: Engineered Fuel Production

In a thirteenth stage, an engineered fuel product can be produced. Prior to thirteenth stage, fine-tuned recombined stream is in a low-density form commonly referred to as "fluff". A fuel in "fluff" form typically has a weight density of about 6-10 pounds/cubic ft. and a particle size of approximately 2 inches with a generally 2-dimensionsal (flat) structure. In thirteenth stage, an engineered fuel product with a higher density than fluff can be manufactured that also meets customer specifications for fuel content and/or composition, according to the illustrative embodiments provided herein. In certain illustrative embodiments, the density of the engineered fuel product can be controlled via manipulation of heat and force in the production equipment.

In certain illustrative embodiments, fine-tuned recombined stream can be delivered to a densifier. In densifier, fine-tuned recombined stream can be mechanically driven into a plurality of dies. The materials in fine-tuned recombined stream are compressed under high pressure via one or more press wheels which rotate within dies. Dies can also be heated to allow the plastic constituent within fine-tuned recombined stream to become malleable. Densifiers such as those manufactured by Lundell Enterprises of Cherokee, Iowa or Amandus Kahl GmbH & Co. KG may be used, although densifiers by other manufacturers may also be utilized.

In certain illustrative embodiments, dies can be heated to a temperature in the range of approximately 200 to 250 degrees Fahrenheit, whereby constant heat is preferably maintained within dies via electrical or other heating methods. The heat in dies coupled with the force of press wheels causes the plastic constituent in fine-tuned recombined stream to become malleable which in turn encases the material in fine-tuned recombined stream within a hardened shell to form a pelletized fuel product.

In certain embodiments, the engineered fuel product in highly-dense pelletized form has a consistent size (⅞ inch diameter×1 to 2 inch length) and an average weight density of about 30 pounds/cubic ft (about 810 pounds/cubic yd).

In another illustrative embodiment, an engineered fuel product in "crumb" form can be produced. In this embodiment, fine-tuned recombined stream passes through dies at a higher volume and lower temperature than when the pelletized engineered fuel product is produced. In a specific embodiment, electrical heat is not provided to dyes, and instead fine-tuned recombined stream is heated by the friction between dyes and press wheels. As a result, fine-tuned recombined stream experiences about the same amount of force via direct pressure within dies, with a reduced temperature exposure. This can produce a "crumb" material that is finely shredded and less dense than the pelletized product. For example, as compared to the pelletized product having a size of ⅞ inch diameter and 1-2 inches in length, and the fluff material having a particle size of approximately 2 inches in a primarily 2-dimensional (flat) configuration, the "crumb" material has a reduced particle size of approximately 1 inch in a primarily 3-dimensional (stacked or piled) configuration.

In certain illustrative embodiments, the engineered fuel product in partially densified "crumb" form has an average weight density of about 18-25 pounds/cubic ft, which is significantly less than the average weight density of about 30 pounds/cubic ft for the engineered fuel product in pelletized form, and significantly more than the average weight density of about 6-10 pounds/cubic ft for the mix of medium weight and light weight materials in fluff form.

The "crumb" material has proven beneficial for end users due to the lighter nature of the fuel and its ability to be introduced to the combustion process via air induction and/or mechanical introduction or other means in locations where a pelletized fuel product is too large to fit. The lighter crumb material can also be introduced in varying stages of the end process due to the low retention time and quick ignition. It has also been observed that, in certain illustrative embodiments, utilizing the engineered fuel product in a partially densified "crumb" form yields the following advantages: (i) engineered fuel production yields have increased; (ii) engineered fuel transport vehicles continue to achieve maximum transportation axle weights, while fluff could not achieve the required axle weights; (iii) end-users have seen improved combustion kinetics in their combustion units; (vi) greater density prevents the fuel products from being dispersed by prevailing winds; and (v) end-users have greater flexibility in how and where the engineered fuel product is introduced to the combustion zone.

The engineered fuel product manufactured according to the process and system described herein can have the product specifications set forth below, in certain illustrative embodiments. These specifications were developed based on engineering controls and verified with a week of daily composite sampling and analysis. Three test burns of process engineered fuel were conducted at a major global cement manufacturer's facility, with progressively larger amounts of engineered fuel combusted in each of the trials (500 tons, 1,000 tons and 2,000 tons). Key results are incorporated below.

Ongoing fuel batch sampling and analysis for customers, and feedstock composition analysis via spectroscopic equipment can ensure that the production process continues to produce a highly consistent engineered fuel product that meets the specifications set forth herein.

Fuel Composition:

The composition of the process engineered fuel product can be 99 or greater post-recycle fibers and plastic, in certain illustrative embodiments. This distinguishes the process engineered fuel product from traditional refuse derived fuel ("RDF"), including pelletized RDF, which is not processed as rigorously and is contaminated with far higher percentages of inert materials, metals and wet organics. Whether in fluff or pelletized form, RDF would typically not be expected to meet a criterion of 1% or less contamination or unsuitable materials in the fuel mix.

Fuel Heat Content:

The ratio of fibers to plastics may be adjusted for production batches to meet precise customer specifications within ±10%. The fuel heat content of specific formulations can fall between a low of 7,500 Btu/pound and a high of 11,000 Btu/pound based on customer specifications, in certain illustrative embodiments. This feature also distinguishes the process engineered fuel product from RDF, as the heating value of RDF may range up to a high of about 6,500 Btu/pound, but is still significantly below the low-end range heating value of the process engineered fuel product disclosed herein. The high heating value of RDF would not be expected to consistently achieve even the low-end heating value of the process engineered fuel product, which is 7,500 Btu/pound, and the heating value would not be consistent, i.e., could not be effectively targeted to meet a specific value.

Heating Value of the Feedstock Components:

The heating value of each feedstock material stream comprising the process engineered fuel product can be greater than 5,000 Btu/pound. For example, the medium weight materials comprising fibers and rigid plastics can have an average heating value of 6,000 Btu/pound, and the light weight materials comprising film plastics and foam plastics can have an average heating value of greater than 11,000 Btu/pound, in certain illustrative embodiments.

Heating Value and Composition Engineered to Meet Precise Customer Specifications:

The composition and fuel heating value of the process engineered fuel product can be adjusted to meet specifications provided by utility customers based on their combustion unit firing diagrams. For example, to ensure fuel integrity, the fuel composition ratios of fibers to plastics may range from 70:30 fibers/plastics resulting in a heating value of 7,500 Btu/pound, to a ratio of 30:70 fibers/plastics for a fuel heating value of 11,000 Btu/pound. The fuel composition can be verified based on analyses of the process engineered fuel product and continuous process controls including spectroscopic characterization as described in eighth stage 8 above. This ensures that a consistent product that burns evenly without spiking is produced.

Fuel Size:

Fuel feedstock can be mechanically-sized and can be formed into a cylindrical shape (⅞-inch diameter by 1 to 2-inches in length) in pelletized form or a less dense "crumb" form.

Fuel Characteristics:

The mechanical densification of the process engineered fuel into a cylindrical shape creates a thin plastic coating around the outer surface of the fuel cylinder and a pelletized product. The coating ensures a stable fuel that will not breakdown, compost, has no odor and is easy to transport.

Fuel Density:

Fuel density can average 810-945 pounds/cubic yd for the pelletized product and vary based on heat content requested by customer.

Fuel Moisture Content:

Fuel moisture content can range between 5 and 15%.

Fuel Chlorine Content:

Fuel chlorine content can range between non-detect and 0.3%.

Fuel Sulfur Content:

Fuel sulfur content can range between non-detect and 0.3%.

Fuel Mercury Content:

Fuel mercury content can range between non-detect and 0.3 ppm.

Combustion Characteristics:

From the perspective of the combustion facility, one of the most important attributes of engineered fuel is its homogeneity. The rigorous manufacturing process described herein results in a process engineered fuel product with a highly consistent heating value, moisture content, chemical makeup and composition. This allows the process engineered fuel product to burn evenly and completely with few to no spikes.

A trial burn of process engineered fuel product at a cement manufacturing facility precalciner kiln was performed, and the relative impact of the process engineered fuel product on precalciner combustion characteristics and kiln material product was evaluated. The process engineered fuel product was used to replace petroleum coke fuel in the precalciner. The five-day trial results were positive and indicated similar if not improved combustion characteristics during replacement of petroleum coke. Facility engineers closely watched carbon monoxide (CO) measurements as a means to confirm complete burnout of the fuel. No CO spiking occurred, indicative of consistent combustion, and CO measurements stayed below 100 ppm with oxygen at 5%, indicative of complete combustion.

To further assess the impact of process engineered fuel product on combustion as well as kiln material product, buildup of condensed raw material within the last stage of the precalciner was periodically sampled to assess thermo-chemical stability. Excessive buildup will typically occur when the thermochemistry between alkalies, sulfur and chlorine (input fuels and raw materials fed to the kiln system) in the precalciner are imbalanced. Such excessive buildup can quickly force a shutdown of the kiln operation and ruin kiln product. One measure of this potential buildup is to measure the composition of the condensed raw material sulfur and/or chlorine content. For the trial burn, the condensed raw material was sampled and analyzed.

During the five-day trial there was no noticeable buildup within the precalciner as seen in conducted thermal imaging and chlorine content in the condensed raw material remained within acceptable levels throughout the test period, even during periods of an elevated feed of the process engineered fuel product of 16 tons per hour.

Based on the sampling and analysis and consistency of the fuel material, the metals content in the process engineered fuel product should remain in the following ranges from Table 1 below, in certain illustrative embodiments:

TABLE 1

| Metals Content (mg/kg) | |
| --- | --- |
| Antimony | 16.9 to 51.5 |
| Arsenic | non-detect to 0.61 |
| Beryllium | non-detect |
| Cadmium | 0.34 to 1.37 |
| Chromium | 10.30 to 20.60 |
| Cobalt | 0.78 to 1.40 |
| Lead | 12.30 to 48.00 |
| Manganese | 34.00 to 48.00 |
| Nickel | 1.72 to 7.25 |
| Selenium | 1.03 to 1.30 |

A contrast between the process engineered fuel product (according to certain illustrative embodiments) and RDF is set forth in Table 2 below:

TABLE 2

Comparison of Process Engineered Fuel Product to RDF

| Process Engineered Fuel Product | RDF |
| --- | --- |
| Highly Uniform & Consistent Composition<br>The process and system described herein result in a consistent engineered fuel product composed of 99+% fibers and clean plastics. Control of unsuitable fuel materials (e.g., inert, metals, wet organics) or trace contaminants (e.g., chlorine) enhances combustion characteristics and allows engineered fuel product to burn evenly and completely with minimal to no spikes. | Heterogeneous Composition<br>Minimally processed to remove non-combustibles. Whether in pelletized or fluff form, RDF is unable to meet standard of 1% or less contamination by unsuitable fuel materials (e.g., inert, metals, wet organics) or trace contaminants (e.g., chlorine) in fuel mix. |
| Fine-Tuned Heating Content<br>The process and system described herein are designed such that operators can adjust and "fine-tune" the ratio of fibers and clean plastics in the engineered fuel product to within 10% of the customer target value. This ratio correlates directly to heat content and is a parametric measure of the heat content of the engineered fuel product. Btu/pound can be adjusted between 7,500 to 11,000, based on customer specifications. | Minimal Processing/No Fine-Tuning of Heating Content<br>Unrefined material, heterogeneous material mix results in uncontrolled combustion, heating and emission spikes. Cannot be fine-tuned to meet customer combustion specifications. Btu/pound can range between 5,500 to 6,500, depending upon contamination by inert and wet organic materials. |
| Well-Controlled Moisture/Ash Content<br>Engineered fuel product is processed to within 5% of the customer target value using control of components and/or heating process. Moisture (wt %) 5-15, Ash (wt %) 2-15. | Highly Variable Moisture/Ash Content<br>Highly unpredictable Moisture (wt %) 15-35, Ash (wt %) 8-25. Extensive fuel feed system modifications required by end-user. |
| Controlled Chlorine Content<br>The spectroscopic analyzer and sorting system within the process and system described herein allows a user to control the chlorine content of the engineered fuel product to within 0.1% over the course of weekly production. Chlorine content non-detect to 0.3%. | Uncontrolled Chlorine Contamination<br>RDF pellets or fluff generally cannot guarantee chlorine % as there are no controls to identify and reject PVC in processing systems. Chlorine content can range from 0.3% to 2%. |
| Fuel Enhancing Agents<br>The process allows for customized fuel formulations with the addition of fuel enhancing agents such as calcium hydroxide (acid gas scrubbing) or lignin (adjust fuel structure - adjust oxidation rate and improve fuel handling). | No Process Controls to Allow Customization<br>RDF is not manufactured to meet customer's specifications. RDF is minimally processed for disposal in MSW combustion facilities. |

TABLE 2-continued

Comparison of Process Engineered Fuel Product to RDF

| Process Engineered Fuel Product | RDF |
|---|---|
| Clean Burning Fuel Easily Used in Coal-Fired Boilers/Kilns | Higher Emissions, Requires Extensive System Modification |
| Burns cleaner than solid fossil fuels, MSW and RDF, significantly reducing emissions of criteria pollutants and GHGs. End users need not make significant modifications to fuel feed or combustion units. | RDF has much higher ash, moisture, chlorine, and sulfur content causing significantly higher emissions than engineered fuel product. Use of RDF requires extensive combustion unit and fuel feed systems. |

Figure 1:
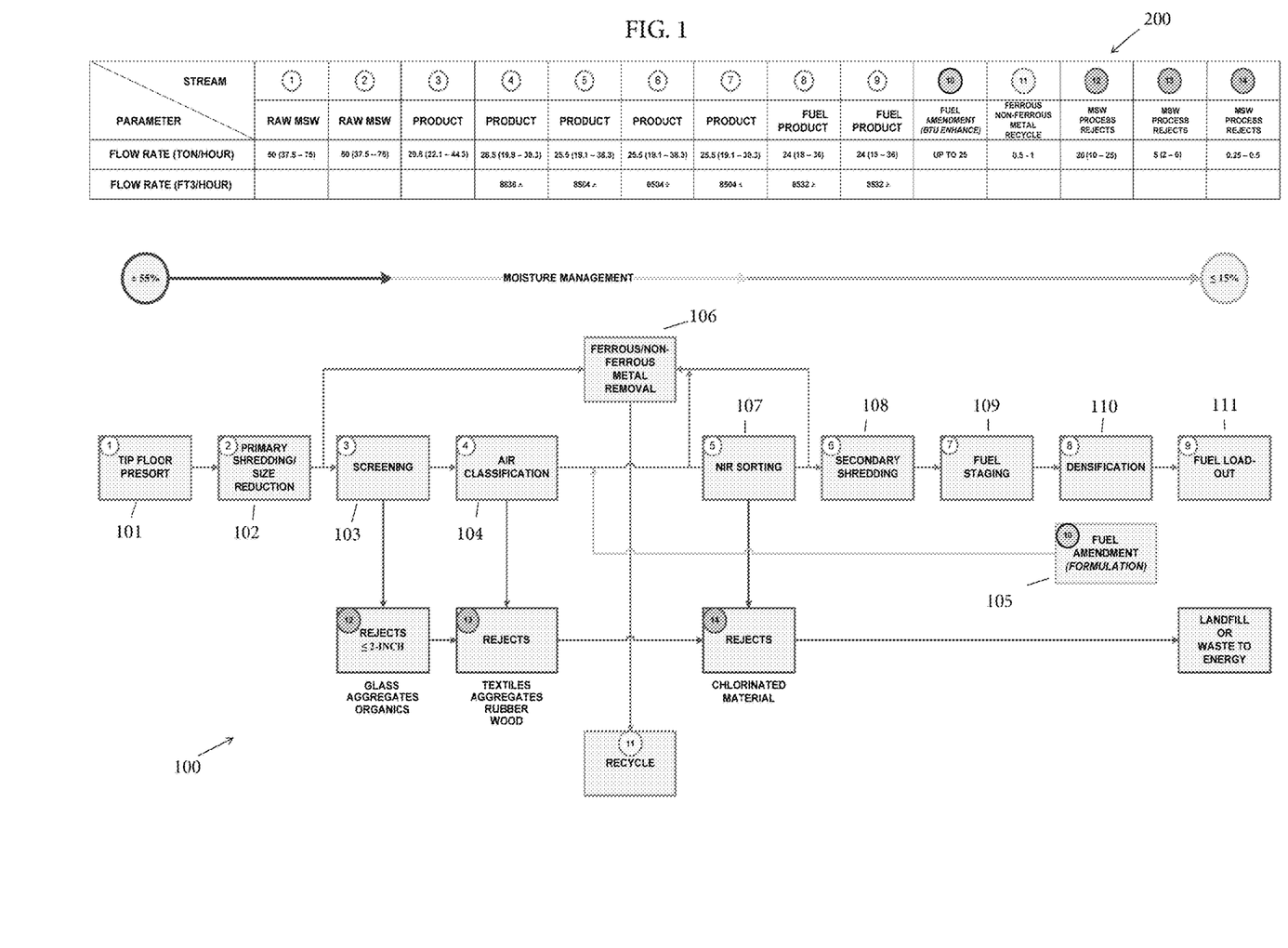
FIG. 1 is a process flow diagram and mass balance for a process for producing an engineered fuel product in accordance with an illustrative embodiment of the presently disclosed subject matter.

In certain illustrative embodiments, a system and process for producing an engineered fuel product is provided. Flow diagrams and mass balances for various illustrative embodiments of the process for producing engineered fuel are shown in FIG. 1 hereto, generally at 100 and 200. FIG. 1 illustrates an exemplary process that may include a plurality of sequential, non-sequential, or sequence independent steps or stages for preparing an engineered fuel product using, for example, the systems and equipment shown or described herein. Note that the process described in FIG. 1 is exemplary, and may be performed in different orders and/or sequences as dictated or permitted by the system and equipment described herein, and any alternative embodiments thereof. In addition, the processes described herein are not limited to the specific use of the system and equipment described herein but may be performed using any system and equipment that is capable of producing an engineered fuel product as described in connection with the processes shown in the figures. Numerous arrangements of the various stages, techniques, equipment and materials can be utilized. In addition, not all stages, techniques, equipment and materials described herein need be utilized in all embodiments. However, it should be noted that certain particular arrangements of equipment and/or process steps for the system and process described herein are materially distinguishable from and provide distinct advantages over previously known technologies, as described in further detail later herein.

In certain illustrative embodiments, a process for treating a solid waste material is provided, wherein the process can comprise one or more of the following stages:

Stage 1—Tip Floor Presort and Removal of Large Metallic Objects

In a first stage 101, a first set of waste components can be removed from the solid waste material. The solid waste material can include municipal solid waste and/or residual solid waste. The first set of waste components can include ferrous and non-ferrous metals contained within the solid waste material. The solid waste material can be received initially, for example, as a raw in-bound waste material dropped onto the process floor (or "tipping floor") of the waste processing facility by a waste delivery vehicle. Large and/or bulky metallic components of high density and physical size of ±25-inches (i.e. tire rims, brake drums, metal doors, etc.) that could cause damage to the primary shredder can be removed on the process floor. For example, a magnetic four over three grapple claw attached to the excavator boom can be utilized to remove these large metallic materials.

In certain illustrative embodiments, further removal of metallic components can occur. For example, the solid waste material can be passed through a metal detector that is preset to remove metallic components greater than 12-inches by 8-inches by ½-inch thickness. Metallic components greater than ½-inch thick have a high probability of damaging the internal cutters of the primary shredder. Thus, removal of metals of this thickness specification can greatly improve shredder performance, if the metals are removed beforehand.

In certain illustrative embodiments, the solid waste material can be passed under a metal detector via a conveyer moving in a first or forward direction. The movement of the conveyer can be reversed to an opposite or backwards direction if the metal detector detects the first set of waste components in the solid waste material. Then, the first set of waste components can be removed from the conveyer with the magnet. This first stage 101 generally corresponds to the stage 1 ("Removal of Heavy and/or Bulky Items") and stage 2 ("Removal of Large Metal Objects") described in a previous embodiment herein.

Stage 2—Primary Shredding/Size Reduction

In a second stage 102, shredding of the solid waste material can occur in a primary shredder. This shredding can break up the materials in the municipal solid waste to produce a homogeneous material suitable for further mechanical processing. In certain illustrative embodiments, the materials can be shredded to a particle size of 10-inch or less. This second stage 102 generally corresponds to the stage 3 ("Slow-Speed, High Torque, Primary Pre-Shredding") described in a previous embodiment herein, with the exception that the materials are shredded to a smaller dimensional size.

Stage 3—Screening

In a third stage 103, the solid waste can be passed through a screener to reject undesired materials. In certain illustrative embodiments, the solid waste can be screened to a size of 2-inch particle size or less (such as fines) immediately after shredding the solid waste material to a particle size of 10-inch or less (two-dimensional). The screened materials can include materials such as organics (i.e., food waste) as well as additional materials such as glass, batteries, E-waste, and aggregates which can all comprise the heavier weight, higher-moisture materials in the solid waste material. In certain illustrative embodiments, the screening can occur via a vibratory screening process, whereby the screened materials are rejected as "unders" while material "overs" can proceed to Stage 4 air classification. For example, a vibrating waste screener such as the type available from IFE Aufbereirtungstechnik GmbH or Spaleck GmbH & Co. KG can be utilized. The vibrating waste screener can have a plurality of vibrating screen decks to promote separation, in certain illustrative embodiments. Vibrating waste screeners with decks can provide improved waste separation as compared to commonly known rotary trommel screeners.

Stage 4—Air Classification.

In a fourth stage 104, a second set of waste components can be removed from the solid waste material after the waste components have undergone screening to a size of 2-inch particle size or less. The second set of waste components can include materials such as aggregates, wood, textiles and rubber, which comprise the heavier weight materials in the solid waste material of Stage 4.

In general, the solid waste material can include heavier weight components, medium weight components and lighter weight components. The heavier weight components can include, as described above, the second set of waste components which comprises aggregates, wood, textiles and rubber. The medium weight components can include one or more of fibers and rigid plastics, and the lighter weight components can include one or more of foam plastics and film plastics. In some cases, the combined medium weight components and lighter weight components can have a nominal density of 8 pounds/cubic foot or less as compared to the heavier weight components. In certain illustrative embodiments, the second set of waste components can be removed from the solid waste material by passing the solid waste material through a separator such as, for example, a wind sifter or other type of air classifier device such as the type manufactured by Westeria Fordertechnik GmbH. In doing so, the moisture content of the final engineered fuel product made from the solid waste material can be adjusted and controlled as desired.

Figure 2A:
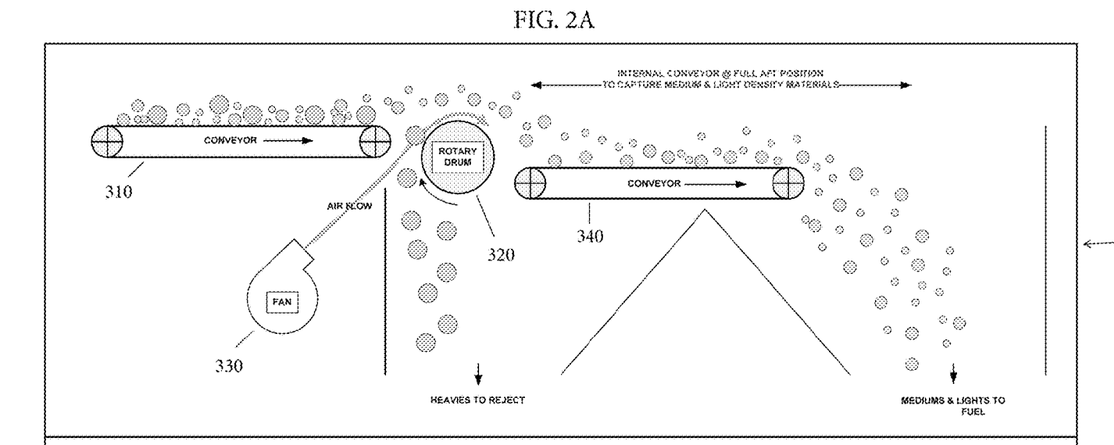
FIGS. 2A and 2B are front views of a separator used in a process and system for producing an engineered fuel product in accordance with an illustrative embodiment of the presently disclosed subject matter.
Figure 2B:
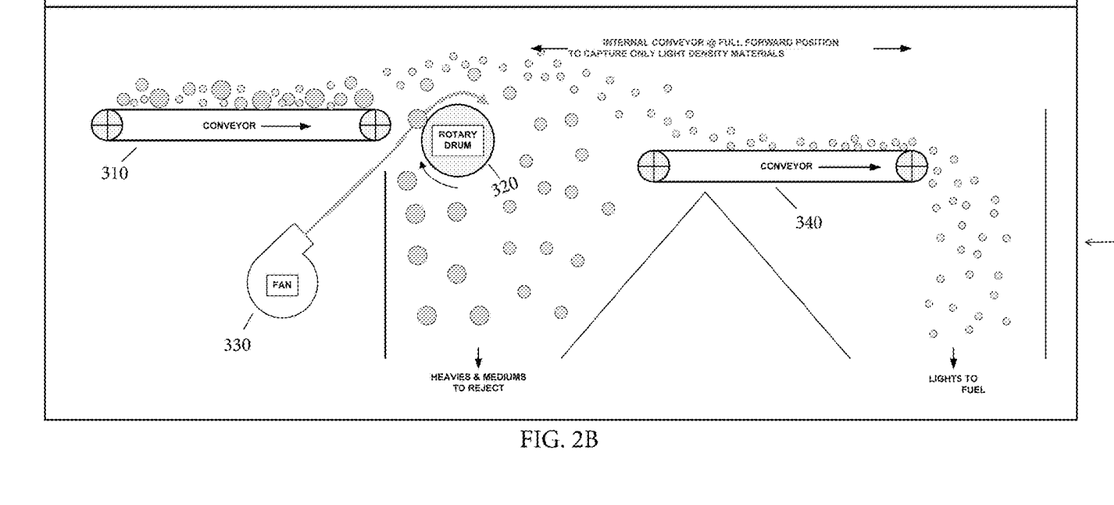

An illustrative embodiment of a windsifter separator 300 is shown in FIGS. 2A and 2B. The solid waste material can be introduced into the separator 300. In certain illustrative embodiments, the heavier weight components can be separated from the medium weight components and the lighter weight components in the separator 300. For example, in certain illustrative embodiments, the separator 300 can comprise a delivery device 310 such as a first conveyer, a rotary drum 320, an air supply device 330 and a receiver device 340 such as a second conveyer. Delivery device 310 and receiver device 340 are preferably disposed on opposite sides of rotary drum 320. The delivery device 310 carries the solid waste material towards the rotary drum 320. Air flow from the air supply device 330 blows onto the solid waste material as onto the solid waste material attempts to pass over the top side of rotary drum 320, which is rotating in a clockwise direction towards receiver device 340. In certain illustrative embodiments, most of the heavier weight components will fall off of the delivery device 310 and are rejected as heavies or "unders" without being able to pass over the top of rotary drum 320. In certain illustrative embodiments, most of the medium weight components and light weight components are able to pass over the top of rotary drum 320 either alone or with assistance from the air flow from air supply device 330, thus distributing these medium weight components and lighter weight components as "overs" in the direction of receiver device 340. Thus, the receiver device 340 can be capable of receiving an amount of the medium weight components and the light weight components that have passed over rotary drum 320.

In certain illustrative embodiments, the receiver device 340 can be positioned at either a first receiving location or a second receiving location with respect to the rotary drum 320 of the separator 300, and the moisture content of the engineered fuel product can be adjusted based on manipulation of the location of the receiver device 340. In general, the engineered fuel product will have a higher moisture content if it contains a higher percentage of medium weight materials. Thus, the moisture content of the engineered fuel product can be increased by moving the receiver device 340 from the second receiving location to the first receiving location or otherwise positioning the receiver device 340 in the first receiving location (as shown in FIG. 2A) to receive more of the medium weight components. Also, the moisture content of the engineered fuel product can be decreased by moving the receiver device 340 from the first receiving location to the second receiving location or otherwise positioning the receiver device 340 in the second receiving location (as shown in FIG. 2B) to receive less of the medium weight components. Thus, when positioned at the first receiving location (FIG. 2A), the receiver device 340 can be capable of receiving more of the medium weight components than when positioned the second receiving location, and when positioned at the second receiving location (FIG. 2B), the receiver device 340 can be capable of receiving more of the lighter weight components than when positioned the first receiving location.

In certain illustrative embodiments, the receiver device 340 can be a single receiver that receives both the lighter weight components and the medium weight components. For example, the receiver device 340 can be a conveyer belt that is moveable between different locations with respect to its distance from rotary drum 320. Delivery device 310 can also be a conveyer belt that delivers the solid waste material towards rotary drum 320. Air supply device 330 can be a fan or similar air blower device.

In certain illustrative embodiments, the amount of heavy weight components captured in the receiver device 340 can be less than one percent (1%) of the total amount of components captured in the receiver device 340.

Once the heavier weight materials (the "unders") have been removed or substantially separated from the solid waste material, the remaining medium weight components and lighter weight components (the "overs"), which typically include one or more of fibers, rigid plastics, foam plastics and film plastics, can proceed to further processing stages.

Stage 5—Fuel Amendment

In a fifth stage 105, a clean stream of pre-sorted materials can be proportionally adding to the solid waste material. The clean stream can include, for example, fibers and clean plastics. These pre-sorted materials can be proportionally added to the solid waste material to produce a "fine-tuned" stream. The metered addition of the "fine-tuned" stream to the solid waste material can produce an engineered fuel product that meets customer specifications for various desired features. This fifth stage 105 generally corresponds to stage 9 ("Fine Tuning of Engineered Fuel Product") described in a previous embodiment herein.

Stage 6—Ferrous/Non-Ferrous Metal Removal

In a sixth stage 106, a third set of waste components can be removed from the solid waste material. The third set of waste components can include ferrous and non-ferrous metals having a size of less than 10-square inches (essentially two dimensional). For example, the solid waste material can be passed under an over-belt magnet to remove the ferrous metals and through an eddy current separator to remove the non-ferrous metals. The recovered metals can be recycled. This sixth stage 106 generally corresponds to stage 4 ("Ferrous Metal Extraction") and stage 7 ("Eddy Current—Non-Ferrous Metal Extraction") described in a previous embodiment herein.

Stage 7—NIR Sorting

In a seventh stage 107, the materials can undergo can undergo chlorine removal and removal of additional materials via an NIR/HIS (near infrared spectroscopic/hyper spectral imaging) sorter. The sorter can analyze the radiation reflected from the material stream being sorted and identify various plastic and fibers. The system can then use high precision particle detection followed by a burst of compressed air to separate the detected particles. The NIR/HIS equipment is commercially available from, for example, RTT Steinert GmbH, Pellenc ST, or Tomra Sorting Solutions a.k.a, TiTech. This seventh stage 107 generally corresponds to stage 8 ("Near Infrared (NIR) Spectroscopic/Hyper Spectral Imaging System (HIS) Sorting") described in a previous embodiment herein.

Stage 8—Secondary Shredding

In an eighth stage 108, all or substantially all of the solid waste material can be reshredded to a particle size of 2-inch or less. The purpose of this additional shredding is to produce a particle size that can easily pass through the dies of the densifier described in Stage 9 without causing plugging. This eighth stage 108 generally corresponds to stage 10 ("High Speed Shredding") described in a previous embodiment herein.

Stage 9—Fuel Staging

In a ninth stage 109, staging and drying of the solid waste materials can occur. This ninth stage 109 generally corresponds to stage 11 ("Staging/Drying") described in a previous embodiment herein.

Stage 10—Densification

In a tenth stage 110, the solid waste material (now characterized as fluff in certain illustrative embodiments) can be densified to produce an engineered fuel product. This tenth stage 110 generally corresponds to stage 8 ("Near Infrared (NIR) Spectroscopic/Hyper Spectral Imaging System (HIS) Sorting") described in a previous embodiment herein.

Stage 11—Fuel Load Out

In an eleventh stage 111, the densified fuel can be loaded onto fuel trailers for shipment to end users such as, for example, cement/lime manufacturers and utilities.

In certain illustrative embodiments, the final engineered fuel product can be engineered to meet various end user fuel specifications. For example, the final engineered fuel product can be a pelletized product having a weight density of nominal 30 pounds/cubic ft. The engineered fuel product can also be a non-pelletized product having a weight density of nominal 22 pounds/cubic ft. In some aspects, ninety nine percent (99%) or greater by volume of the engineered fuel product can comprise fibers and clean plastics. In some aspects, the engineered fuel product can comprise less than three-tenths of one percent (0.3%) chlorides. In certain illustrative embodiments, the solid waste material can have a moisture content of ±fifty five percent (55%) prior to removing the first set of waste components from the solid waste material, and the final engineered fuel product can have a moisture content of fifteen percent (15%) or less. The engineered fuel product can have a chloride content of three tenths of one percent (0.3%) or less. The engineered fuel product can have a heating value of nominal 11,000 BTU/pound.

In certain illustrative embodiments, the system and process described herein is materially distinguishable from, and provides distinct advantages over, previously known technologies. The system and process described herein also displays certain unexpected and surprising results. For example, in certain illustrative embodiments, it has been found that through improved waste screening and air classification, such as described in Stage 3 (103) and Stage 4 (104) herein, a more robust removal of contaminants at all stages (fines, inert materials, metals, etc. . . . ) can be achieved and moisture levels in the engineered fuel product can be reduced and/or more precisely controlled. For example, moisture content in the engineered fuel product can be manipulated more quickly and/or to a more exact value than with prior technologies. In certain illustrative embodiments, fuel density can average 810-945 pounds/cubic yard for the pelletized product and can vary based on heat content requested by customer, and fuel moisture content can range between 5 and 15%, in the alternative systems and processes described herein.

The engineered fuel product can be a sustainable fuel replacement for coal, petroleum coke and other traditional solid fuels used to produce steam, electricity or heat. The engineered fuel product can meet precise end-user fuel specifications such as BTU value, biogenic carbon content, and low sulfur content, and can be easily used in coal-fired boilers and kilns. The process for manufacturing the engineered fuel product extracts materials of value from the solid waste stream for recycling and fuel production resulting in significant landfill diversion (up to 65%, in certain illustrative embodiments). The engineered fuel product is a high BTU fuel that burns cleaner than solid fossil fuels, significantly reducing criteria air pollutants and GHG emissions. The engineered fuel product is also a cost-effective compliance tool to meet emissions standards under the Clean Air Act. In certain illustrative embodiments, the process can produce 4-6 tons/hour per production unit. The engineered fuel product can typically be stored in an enclosed, covered storage unit for 1-3 days before being transported to the customer via truck, rail or barge along with the supporting material safety data sheets (MSDS).

It is to be understood that the described subject matter is not limited to the exact details of construction, operation, exact materials, or illustrative embodiments shown and described, as modifications and equivalents will be apparent to one skilled in the art. Accordingly, the subject matter is therefore to be limited only by the scope of the appended claims.

What is claimed is:

1. A process for treating a solid waste material, the process comprising:
    removing a first set of waste components from the solid waste material, the first set of waste components comprising ferrous and non-ferrous metals;
    shredding the solid waste material;
    removing a second set of waste components from the solid waste material, the second set of waste components comprising one or more of organics, glass, aggregates, wood, electrical components, batteries, textiles, rubber and yard waste;
    proportionally adding a clean stream to the solid waste material, the clean stream comprising fibers and clean plastics, such that a desired plastics content is introduced into the solid waste material;
    removing a third set of waste components from the solid waste material, the third set of waste components comprising ferrous and non-ferrous metals;
    reshredding the solid waste material; and
    densifying the solid waste material.

2. The process of claim 1, wherein the solid waste material is shred to a particle size of 10-inch or less before removing the second set of waste components and is reshred to a particle size of 2-inch or less after removing the third set of waste components.

3. The process of claim 2, further comprising:
    passing the solid waste through a screener to reject materials of 2-inch particle size or less after shredding the solid waste material to a particle size of 10-inch or less.

4. The process of claim 1, wherein the ferrous and non-ferrous metals of the first set of waste components have dimensions of 12-inch by 8-inch by ½-inch thickness or greater.

5. The process of claim 1, wherein the ferrous and non-ferrous metals in the third set of waste components have a size of ten square inches or smaller.

6. The process of claim 1, further comprising, prior to proportionally adding the clean stream to the solid waste material:
- introducing the solid waste material into a separator, the solid waste material comprising heavier weight components, medium weight components and lighter weight components, wherein the combined medium weight components and lighter weight components have a combined density of 8 pounds/cubic foot or less;
- separating the heavier weight components from the medium weight components and the lighter weight components in the separator;
- positioning a receiver at either a first receiving location or a second receiving location with respect to the separator, wherein the receiver is capable of receiving the medium weight components and the light weight components, and wherein the first receiving location receives more of the medium weight components than the second receiving location;
- capturing an amount of the medium weight components and an amount of the lighter weight components in the receiver; and
- densifying the medium weight components and lighter weight components to produce an engineered fuel product.

7. The process of claim 6, wherein the heavier weight components comprise one or more of wood, textiles, aggregates and rubber.

8. The process of claim 6, wherein the medium weight components comprise one or more of fibers and rigid plastics.

9. The process of claim 6, wherein the lighter weight components comprise one or more of foam plastics and film plastics.

10. The process of claim 6, further comprising:
- decreasing the moisture content of the engineered fuel product by moving the receiver from the first receiving location to the second receiving location to receive less of the medium weight components.

11. The process of claim 6, further comprising:
- increasing the moisture content of the engineered fuel product by moving the receiver from the second receiving location to the first receiving location to receive more of the medium weight components.

12. The process of claim 6, wherein the solid waste material comprises one or more of municipal solid waste and residual solid waste.

13. The process of claim 6, wherein the solid waste material has a moisture content of 55 percent or greater prior to entering the separator and the engineered fuel product has a moisture content of 15 percent or less.

14. The process of claim 6, wherein the receiver is a single receiver that receives both the lighter weight components and the medium weight components.

15. The process of claim 6, wherein the receiver is a conveyer belt.

16. The process of claim 6, wherein the separator is a wind sifter.

17. The process of claim 6, wherein the amount of heavy weight components captured in the receiver is less than one percent of the total amount of heavy weight components, medium weight components and light weight components captured in the receiver.

18. The process of claim 1, wherein the first set of waste components are removed from the solid waste material prior to shredding the solid waste material.

19. A process for treating a solid waste material, the process comprising:
- removing a first set of waste components from the solid waste material, the first set of waste components comprising ferrous and non-ferrous metals;
- shredding the solid waste material;
- removing a second set of waste components from the solid waste material, the second set of waste components comprising one or more of organics, glass, aggregates, wood, electrical components, batteries, textiles, rubber and yard waste;
- proportionally adding a clean stream to the solid waste material, the clean stream comprising clean plastics;
- removing a third set of waste components from the solid waste material, the third set of waste components comprising ferrous and non-ferrous metals;
- reshredding the solid waste material; and
- densifying the solid waste material to produce an engineered fuel product having a plastics content.

20. The process of claim 19, wherein the engineered fuel product has a fuel heat content in the range from 7,500 Btu/pound to 11,000 Btu/pound.

21. The process of claim 19, wherein clean stream further comprises fibers, and wherein the engineered fuel product has a fuel composition ratio of fibers to plastics in the range from 70:30 fibers/plastics to 30:70 fibers/plastics.

22. The process of claim 19, wherein clean stream further comprises fibers, and wherein the engineered fuel product has a fuel composition ratio of fibers to plastics of about 70:30 fibers/plastics.

23. The process of claim 19, wherein clean stream further comprises fibers, and wherein the engineered fuel product has a fuel composition ratio of fibers to plastics of about 30:70 fibers/plastics.

24. The process of claim 19, wherein clean stream further comprises fibers, and wherein the engineered fuel product has a fuel composition ratio of fibers to plastics of about 50:50 fibers/plastics.

25. The process of claim 19, wherein clean stream further comprises fibers, and wherein ninety nine percent (99%) or greater by volume of the engineered fuel product comprises fibers and clean plastics.

* * * * *